(12) United States Patent
Colle et al.

(10) Patent No.: US 8,836,571 B2
(45) Date of Patent: Sep. 16, 2014

(54) METHOD FOR TRANSMISSION OF A GEOGRAPHIC COORDINATE

(75) Inventors: Julien Colle, Toulouse (FR); Eric De Larminat, Change (FR)

(73) Assignee: Thales, Neuilly sur Seine (FR)

( * ) Notice: Subject to any disclaimer, the term of this patent is extended or adjusted under 35 U.S.C. 154(b) by 714 days.

(21) Appl. No.: 13/130,994

(22) PCT Filed: Nov. 18, 2009

(86) PCT No.: PCT/EP2009/065425
§ 371 (c)(1),
(2), (4) Date: Jul. 28, 2011

(87) PCT Pub. No.: WO2010/060847
PCT Pub. Date: Jun. 3, 2010

(65) Prior Publication Data
US 2011/0309965 A1  Dec. 22, 2011

(30) Foreign Application Priority Data

Nov. 25, 2008 (FR) ...................................... 08 06612

(51) Int. Cl.
| | | |
|---|---|---|
| *G01S 13/78* | (2006.01) | |
| *G01S 13/76* | (2006.01) | |
| *G01S 5/00* | (2006.01) | |
| *G06T 17/05* | (2011.01) | |
| *G01C 21/20* | (2006.01) | |
| *G01C 15/00* | (2006.01) | |
| *G01B 21/04* | (2006.01) | |

(52) U.S. Cl.
CPC .............. *G01S 13/765* (2013.01); *G01C 21/20* (2013.01); *G01C 15/00* (2013.01); *G01B 21/04* (2013.01); *G01B 21/045* (2013.01); *G01S 5/0072* (2013.01); *G01S 13/78* (2013.01); *G06T 17/05* (2013.01)
USPC ........................................................ 342/45

(58) Field of Classification Search
CPC .... G01B 21/042; G01B 21/045; G01B 21/04; G01C 15/00; G01C 21/20

USPC .................................. 342/45; 702/5, 95, 150
See application file for complete search history.

(56) References Cited

U.S. PATENT DOCUMENTS

| | | | | |
|---|---|---|---|---|
| 7,266,477 | B2 * | 9/2007 | Foessel .......................... | 702/189 |
| 7,457,720 | B2 * | 11/2008 | Ebert ............................. | 702/150 |
| 7,595,725 | B1 * | 9/2009 | Joseph et al. .............. | 340/539.2 |

FOREIGN PATENT DOCUMENTS

| | | |
|---|---|---|
| WO | 00/28347 A1 | 5/2000 |
| WO | 02/097762 A1 | 12/2002 |

OTHER PUBLICATIONS

R.D. Grappel and V.A. Orlando: "SSR Improvements and Collision Avoidance Systems Panel Working Group 1, and Algorithm for Compact Position Reporting (CPR)," SICASP/WG-1, WP/1-403, Apr. 26, 1994.
Daniel Storm Hicok, et al., "Application of ADS-B for Airport Surface Surveillance", Digital Avionics System Conference, Oct. 31-Nov. 7, 1998, pp. F34/1-F34/8, vol. 2, The AIAA/IEE/SAE, Bellevue, WA, US, XP010318131.
Larry Kenney, et al., "Secure ATC Surveillance for Military Applications", Military Communications Conference, Nov. 16, 2008, pp. 1-6, IEEE, Piscataway, NJ, US, XP031408162.
* cited by examiner

*Primary Examiner* — Frank J McGue
(74) *Attorney, Agent, or Firm* — Baker & Hostetler LLP

(57) ABSTRACT

A method for transmission to a receiver of a geographic coordinate λ of a transmitter positioned in a spherical coordinate system λ, φ, at least a portion of one hemisphere of the Earth's sphere being divided into N sections each bounded by a minimum φ and a maximum φ, each section being subdivided into X cells each bounded by a minimum λ and a maximum λ, X varying depending on the section, includes at least the following steps: partitioning all of the latitude sections into M+1 classes, M sections being interspersed between two sections of the same class; transmitting, in one and the same message, the coordinate λ of the transmitter referenced relative to the cell in which the transmitter is located and the class of the latitude section in which the transmitter is located, the range of the receiver being at the most equal to the width of a cell along the axis of variation of the coordinate λ.

12 Claims, 5 Drawing Sheets

METHOD FOR TRANSMISSION OF A GEOGRAPHIC COORDINATE

CROSS-REFERENCE TO RELATED APPLICATIONS

This application is a National Stage of International patent application PCT/EP2009/065425, filed on Nov. 18, 2009, which claims priority to foreign French patent application No. FR 0806612, filed on Nov. 25, 2008, the disclosures of which are incorporated by reference in their entirety.

FIELD OF THE INVENTION

The present invention relates to a method for transmission of a geographic coordinate from a transmitter to a receiver. It is notably applicable to the naval field and to the field of air transport for transmitting coordinates independently from one another between remote responder and interrogator.

BACKGROUND

When it is desired to determine the approximate position of an object equipped with a responder, for example an aircraft, starting from a receiver, for example a ship equipped with a transponder, a known technique is to interrogate the responder and to analyze the time needed for the reception of the response generated by the latter. This is because the angular sector within which the responder is located and the distance at which it is traveling can be determined by ascertaining the antenna coverage of the receiver and of the time taken between the transmission of the interrogation and the reception of the response transmitted by the responder, respectively.

However, the precision obtained by this method is sometimes insufficient. In order to determine the position of an object more precisely, specific pieces of equipment may be installed, both in the interrogation system and in the object equipped with the responder, in such a manner as to allow the object to transmit its precise coordinates by radio communications and in a format permitting a high enough precision. However, this solution requires the use of additional hardware.

It is also possible to forego the conventional use of the identification codes transmitted by a responder in order to transmit, in place of such a code, a coordinate formatted in the manner of an identification code. Nevertheless, some identification formats are very limited by the size of the messages to be transmitted. By way of example, for responders communicating via the SIF (Selective Identification Features) protocol, only 13 bits are available for transmission of a data value, whereas, for example, in order to obtain a precision of around 330 m, 16 bits are required for transmission of a latitude coordinate and 17 bits are required for transmission of a longitude coordinate, since the Earth's circumference is approximately equal to 40,000 km ($40{,}000/2^{17}{<}330$).

An algorithm known by the name "Compact Position Reporting" or CPR allows the number of bits needed for the transmission of the coordinates of an object to be reduced. This algorithm is detailed in the following document: "SSR Improvements and collision avoidance systems panel working group 1, an algorithm for compact position reporting (CPR)", R. D Grappel, V. A. Orlando, SICASP/WG-1, WP/1-403, Apr. 26, 1994.

As is illustrated by FIG. 1a, a first subdivision is performed by the CPR algorithm to divide the Earth's sphere 101 into parallel strips 150 at the equator 116, the strips having the same height H. This first subdivision allows the number of bits needed for coding the latitude to be reduced, and the latitude is referenced locally with respect to one of said strips 150. Knowing the region in which the receiver is located and the range limit of this receiver means that the latitude of the transmitter can readily be decoded using the receiver. Thus, to take the aforementioned example, if, using the CPR algorithm, the northern hemisphere is divided into 15 strips of 6° of latitude each, a precision of around 330 m may be obtained by coding the latitude over 10 bits instead of 16 bits without subdivision, a strip of latitude being approximately 670 km from north to south ($670 \text{ km}/2^{10}{<}330 \text{ m}$).

Furthermore, as illustrated in FIG. 1b, a second subdivision by the CPR algorithm is carried out in order to code the longitude over a reduced number of bits. This second subdivision divides the Earth's sphere 101 into separate cells bounded on the east and on the west by meridians 102a, 102b and on the north and on the south by parallels 104a, 104b, the cells being included within latitude sections 106a, 106b, 106c, 106d, 106e. The longitude of the object 108 is then referenced relative to the cell 110 in which the object is located. Thus, taking the aforementioned example, using the CPR algorithm to create cells of 360 nautical miles in width, a precision of around 330 m can be obtained by coding the longitude over 11 bits instead of 17 bits ($360 \times 1852/2^{11}{<}330$ m, 1 nautical mile being equivalent to 1852 m). Furthermore, according to this second CPR subdivision, the width L of the northern border—for the northern hemisphere or the southern border for the southern hemisphere—of a cell is invariant, in such a manner that by changing latitude section, the angular widths of the cells vary. In other words, the number of cells present at a given latitude decreases with distance away from the equator 116 and the cells are shifted with respect to one another from one latitude section 106a to another 106b. Thus, owing to these shifts 118 between cells of different latitudes, the longitude cannot be decoded without knowing the latitude of the object.

A first solution consists in transmitting the longitude and the latitude in one and the same message, in such a manner that the longitude can always be decoded. However, the mode of transmission used does not always allow a total of 21 bits to be transmitted in a message (10 bits+11 bits), as illustrated hereinabove with the example of a responder transmitting messages with a size of 13 bits.

A second solution consists in transmitting the latitude in a first message, the longitude in a second message, then decoding the longitude by virtue of the information on latitude previously received. However, in view of the frequent failures in the transmissions, the probability of obtaining two successful transmissions successively is low. This solution is not therefore satisfactory.

SUMMARY OF THE INVENTION

One aim of the invention is, in the framework of a georeferencing system using spherical coordinates in which at least a first coordinate of a transmitter—for example the longitude—is coded with respect to a local reference point specific to a cell encompassing said transmitter, said cell being chosen from amongst cells with variable angular widths, to transmit this first coordinate to a receiver without having to transmit another coordinate—for example the latitude—in order to be able to decode the first, in other words so that the receiver can re-place the first coordinate of the transmitter into a global reference system without knowing another coordinate of the transmitter. For this purpose, one subject of the invention is a method for transmission to a receiver of a coordinate λ of a transmitter positioned in a spherical coordinate system λ, φ, the first coordinate φ varying along a first axis, the second coordinate λ varying along a second axis orthogonal to the first, at least a portion of one hemisphere of the Earth's sphere being divided into N sections each bounded by a minimum φ and a maximum φ, each section being subdivided into X cells each bounded by a minimum λ and a maximum λ, X varying depending on the section, the method being characterized in that it comprises at least the following steps:

partitioning all of the latitude sections into M+1 classes, M sections being interspersed between two sections of the same class;
   transmitting, in one and the same message, the coordinate λ of the transmitter referenced relative to the cell in which the transmitter is located and the class of the latitude section in which the transmitter is located;

the range of the receiver being at the most equal to the width of a cell along the axis of variation of the coordinate λ.

This method allows the receiver to decode the coordinate λ, in other words to determine the absolute coordinate λ in a global reference system, without the transmitter having to transmit the first coordinate φ.

The transmitter can be an onboard responder, the receiver being a transponder capable of interrogating the responder. The method then allows a coordinate to be transmitted between a responder and a transponder without having to add specific equipment or modify the existing hardware.

According to one embodiment of the transmission method according to the invention, the message for transmission of λ between the interrogator and the responder is formatted according to the Mark X format comprising 13 pulses, the identifier of the section being coded over b bits, the longitude being coded over 13-b bits. The coding precision obtained is then equal to the quotient of the width of a cell by $2^{(13-b)}$.

According to one embodiment of the transmission method according to the invention, the division of the Earth's sphere is carried out according to the "Compact Position Reporting" algorithm, the φ-axis coinciding with the latitude axis, φ varying over a range of 180°, and the λ-axis coinciding with the longitude axis, λ varying over a range of 360°. The re-use of a known subdivision process that is already installed in some equipment thus allows the operations required for the implementation of the method on existing equipment to be minimized.

According to one embodiment of the transmission method according to the invention, the latitude sections are separated into three classes C1, C2, C3, the identifier of the latitude section class then being coded over 2 bits. If the coordinate λ is transmitted in a message using 13 bits, then the coding precision obtained is then equal to the quotient of the width of a cell by $2^{(13-2)}$.

According to one embodiment of the transmission method according to the invention, the partitioning of all of the latitude sections into M+1 classes is carried out by assigning to each section an integer identifier in the range between 0 and M with M<N, the identifier of the $i^{th}$ section being equal to i modulo (M+1).

Another subject of the invention is an IFF responder, IFF being the acronym for "Identification Friend or Foe", the IFF responder being an onboard responder and implementing a method for transmission of a coordinate such as described hereinabove.

BRIEF DESCRIPTION OF THE DRAWINGS

Other features will become apparent upon reading the detailed description, presented by way of non-limiting example, that follows and that makes reference to the appended drawings which show.

DETAILED DESCRIPTION

Figure 1A:
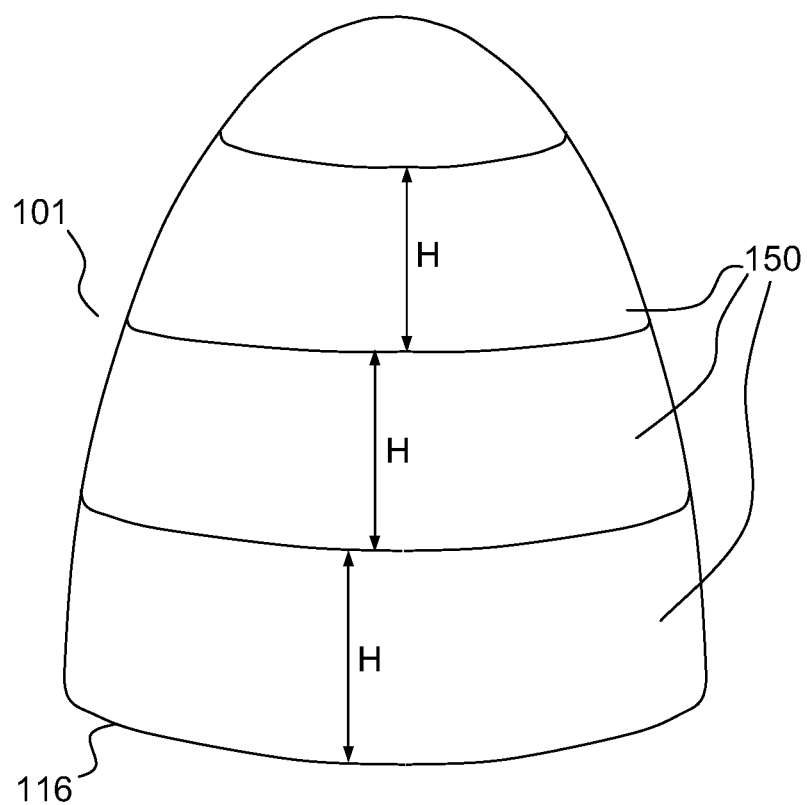
FIGS. 1a and 1b, an illustration of the subdivisions of the Earth's sphere into cells according to the CPR algorithm of the prior art, these figures having already been described hereinabove, FIG. 2, a mimic diagram representing the steps of the transmission method according to the invention, FIG. 3a, a representation as an azimuthal projection of a portion of a hemisphere of the Earth's sphere partitioned by the method according to the invention, FIG. 3b, a representation as a cylindrical projection of a portion of a hemisphere of the Earth's sphere partitioned by the method according to the invention, FIG. 4, an example of use of the method for transmission of a coordinate according to the invention.
Figure 1B:
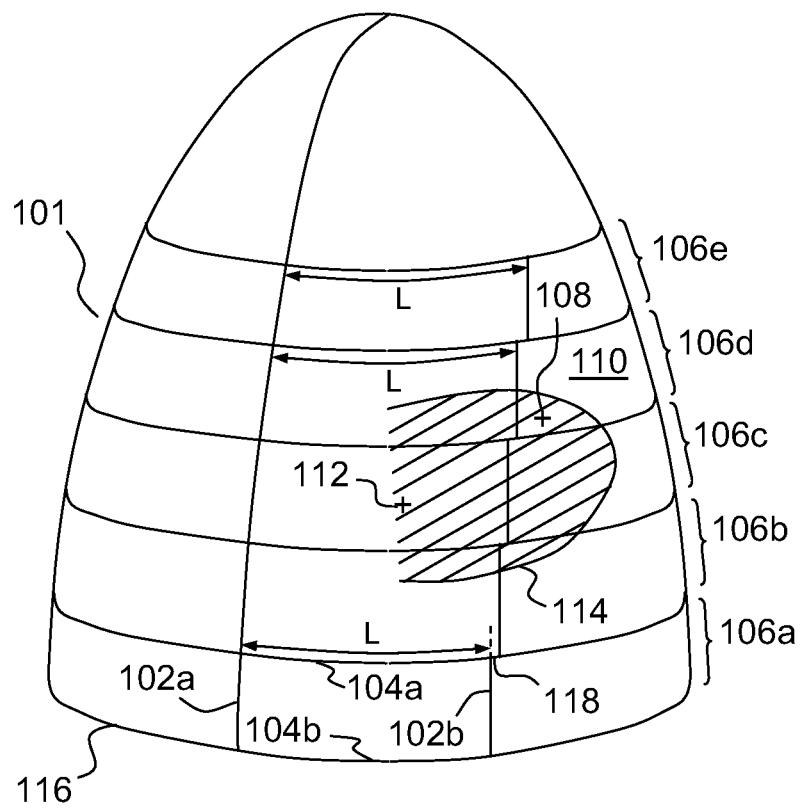
Figure 2:
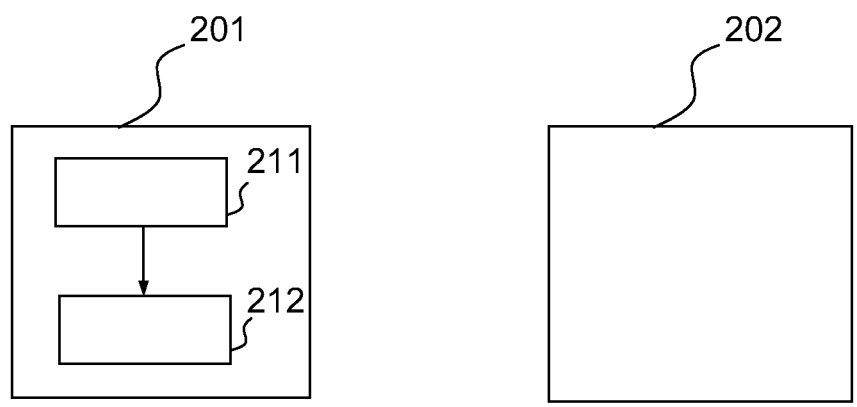

FIG. 2 shows, via a mimic diagram, the steps of one embodiment of the method according to the invention which is implemented by a transmitter and a receiver.

The method according to the invention comprises a first preparatory phase 201 during which a system of coordinates is constructed, which system of coordinates must be managed both at the transmitter and at the receiver. Subsequently, during a second phase 202, the system of coordinates constructed during the first phase 201 is utilized for transmitting a coordinate from the transmitter to the receiver.

The first phase 201 comprises a first step 211 for subdividing the Earth's sphere into cells. This subdivision is, for example, the second subdivision of the CPR algorithm presented hereinabove. In the example, X cells of identical dimensions are created at the equator in the northern and southern hemispheres, respectively, the width L of the northern and southern borders, respectively, of each cell being the same for all the cells. The size L of the cells is chosen, notably, as a function of the range of the antenna of the receiver, of the desired precision in the coding of the coordinates or of the information storage capacity for a message transmitted between the transmitter and the receiver. For example, L is equal to 360 nautical miles. Subsequently, several other sections comprising cells are created between the North Pole—or the South Pole, respectively—of the sphere and the section comprising cells abutting the equator, the widths of the northern borders of all the cells being equal to L. Since the width L of the cells remains constant for the cells further away from the equator, whereas the hemispherical perimeter decreases, the number of cells is also reduced in proportion, thus introducing shifts in longitude between cells of different latitudes. Owing to these shifts, a local value of longitude cannot be translated without ambiguity into a global reference system.

During a second step 212, the latitude sections 106a, 106b, 106c, 106d, 106e are separated into M+1 classes. The assignment of the classes to the latitude sections is carried out in such a manner that M latitude sections are interspersed between two latitude sections belonging to the same class. The interlacing of sections that is thus produced enables it to be guaranteed that two latitude sections belonging to the same class are always separated by a distance equal to the sum of the widths of the interspersed sections. In the example, M is equal to two; in other words, the latitude sections are divided into three classes C1, C2 and C3.

With the subdivision thus carried out, a transmitter can, on the one hand, be referenced by a local latitude and longitude, in other words ones that are defined relative to the cell in which the transmitter is located, and on the other hand, be assigned a class corresponding to the latitude section in which it is located.

During the second phase 202 of the method according to the invention, the transmitter-receiver pair utilizes the system of coordinates previously established.

The transmitter constructs a message for transmission of a coordinate that it transmits to the receiver, the message grouping the local longitude of the transmitter—in other words referenced with respect to the cell in which the transmitter is located—and the latitude class in which the transmitter is located. The coding of the class is, for example, carried out as follows: the $i^{th}$ latitude section is assigned the identifier i modulo (M+1). In the example, as the sections are divided into three classes C1, C2, C3, the identifier therefore varies between zero and two. Accordingly, a coding over 2 bits can be applied in order to represent the class of the latitude section.

By way of illustration, if the transmitter is an IFF responder transmitting messages in the Mark X format with 13 pulses, this means that 13 bits at the most can be transmitted within one and the same message. Since two bits of the message are used for coding the latitude class, 11 bits can then be used for coding the longitude. If, furthermore, a subdivision into cells of 360 nautical miles of width L is carried out, the method according to the invention allows a longitude to be transmitted, in a single message, with a precision approximately equal to $360 \times 1852 \text{ m}/2^{11}$, or around 330 m.

The implementation of the method according to the invention can be carried out by modifying the software modules utilizing the coordinate system, which software modules are installed on the carrier platforms of the responders and interrogators.

According to another embodiment, the subdivision of the sphere differs from the CPR subdivision. For example, the dimensions of the cells differ from those indicated by the CPR algorithm. Furthermore, an ellipsoidal model can equally be employed in place of the spherical model, the coordinates of the transmitter then being referenced with respect to an ellipsoid of revolution.

Figure 3A:
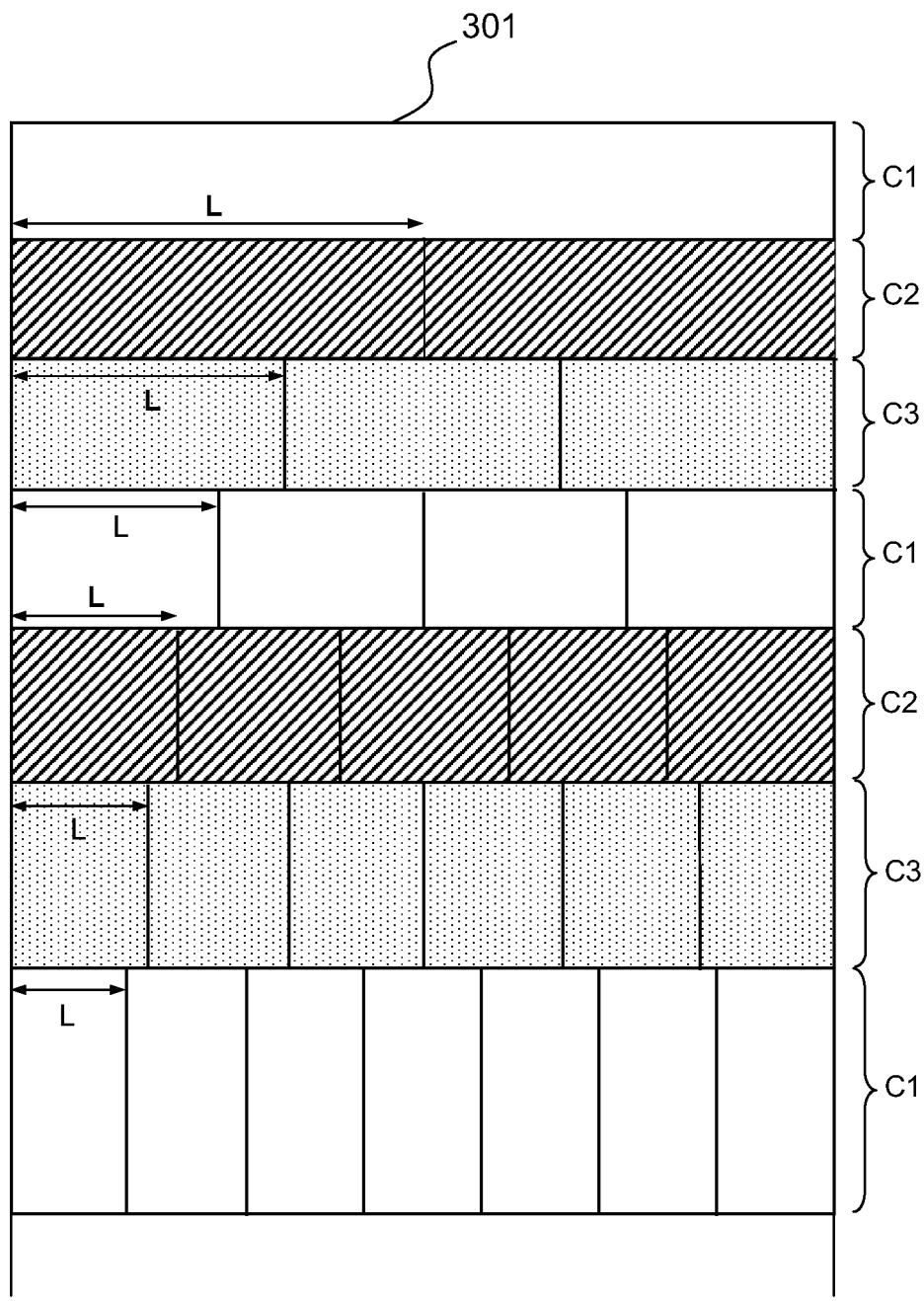

FIG. 3a is a representation as an azimuthal projection of a portion of a hemisphere of the Earth's sphere partitioned by the method according to the invention. In the example, the latitude sections are partitioned into three classes C1, C2, C3. The cells belonging to the sections of the class C1 are shown in white, those belonging to the class C2 are shown with hatching, and those belonging to the class C3 are shown with a dotted pattern. According to this projection, the latitude sections are bounded by concentric circles spaced out by greater and greater distances the greater the distance from the pole 301 of the hemisphere.

Figure 3B:
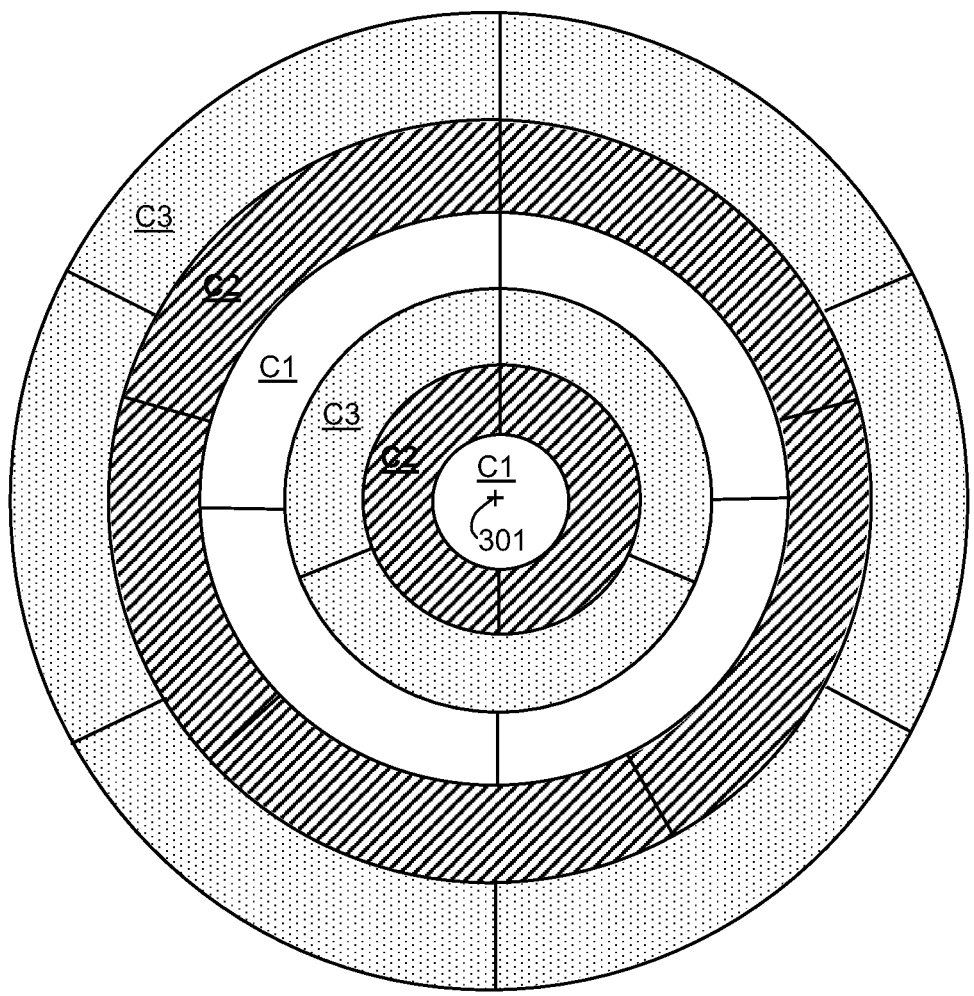

FIG. 3b is a representation as a cylindrical projection of a portion of a hemisphere of the Earth's sphere partitioned by the method according to the invention. The partition is, in the example, the same as that shown in FIG. 3a.

Figure 4:
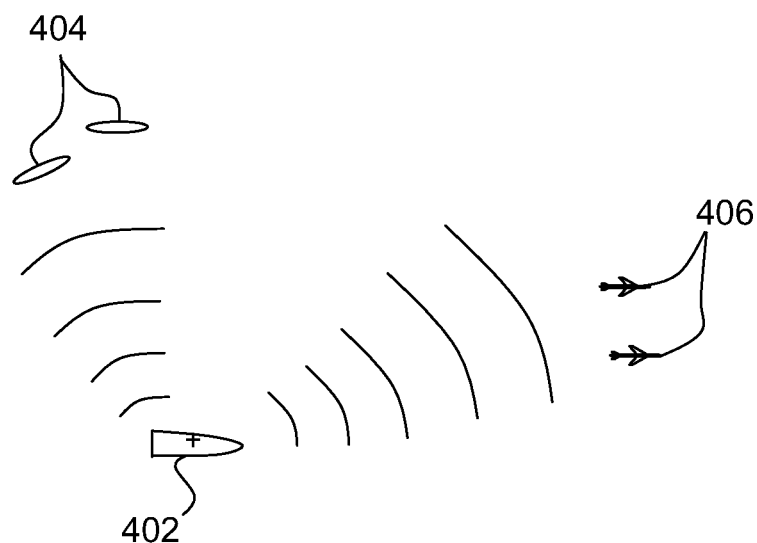

FIG. 4 illustrates an example of the use of the method for transmission of a coordinate according to the invention.

A ship 402 equipped with an interrogator implementing the method according to the invention is given the task of localizing and following the surrounding sea craft 404 and aircraft 406, which are equipped with responders IFF also implementing the method according to the invention.

During a first antenna scanning phase, the interrogator on the ship 402 transmits $N_1$ interrogation messages in order to request the latitude from the surrounding elements (sea craft 404 and aircraft 406). Depending on its geographical separation, on the propagation quality of the messages in the transmission medium and on any obstacles, each of the onboard responders on these elements 404, 406 may or may not receive one or more interrogation messages. The number $N_1$ of messages transmitted can for example be adjusted depending on the radio propagation conditions, in such a manner as to maximize the probability of reaching the receiving antennas of the responders. In response to the interrogation messages, the messages in the Mark X format including the latitude of the carrier are then transmitted by the responders of the elements 404, 406 having received at least one interrogation message. The latitude of each response message is referenced with respect to a strip of latitude in which the responder having transmitted the response message is located. As explained hereinabove, this value of local latitude corresponds, with no ambiguity, to one value of latitude in the Earth's global reference system, by virtue of the limited range of the antenna of the interrogator. The interrogator on the ship 402 then receives the response messages coming from the responders in order to update the latitudes of the localized elements 404, 406.

In a second phase, the interrogator on the ship 402 transmits, via another series of antenna scans, $N_2$ interrogation messages for requesting the longitude from the surrounding elements 404, 406. Response messages, in the Mark X format over 13 bits, are then transmitted by the responders, each of said response messages comprising, in the example, 11 bits for coding the longitude and 2 coding bits for specifying the latitude class in which the responder is located. Upon reception of the response message, the interrogator firstly identifies, by virtue of the estimated approximate position of the responder and of the latitude class in which it is located, the latitude section in which the responder is located, which allows it to decode the longitude. Only one message is therefore required for transmitting the longitude to the interrogator. Thus, in the example, the interrogator does not use the latitude transmitted during the first antenna scanning phase, this information being potentially obsolete.

The method according to the invention can allow the transmission of a coordinate in a geographic coordinate system whose axes do not coincide with those of the traditional latitude-longitude system. For example, the axes may be inclined with respect to the north-south axis.

Aside from the fact that the method according to the invention allows the position of a transmitter to be coded with a reduced number of bits for an equivalent coding precision, one advantage of this method is that its implementation on a responder does not require the deployment of any significant hardware. A software modification within the responder and within the interrogator handling the coordinates is all that is needed in order to incorporate into them the partitioning of the regions of latitudes into several classes, and thus to guarantee the coherence of the coordinate systems used between responder and interrogator.

The invention claimed is:

1. A method for transmission to a receiver of a coordinate $\lambda$ of a transmitter positioned in a geographic coordinate system $\lambda$, $\phi$, wherein $\lambda$ coincides with a latitude, and $\lambda$ coincides with a longitude, at least a portion of one hemisphere of the Earth's sphere being divided into N latitude sections each bounded by a minimum $\phi$ and a maximum $\phi$, each latitude section being subdivided into X cells each bounded by a minimum $\lambda$ and a maximum $\lambda$, X varying depending on the section, comprising:

partitioning with a transmitter the latitude sections into M+1 classes, where M is a integer, and M sections being interspersed between two sections of the same class; and transmitting with the transmitter and receiving with the receiver, in one and the same message, a coordinate λ of the transmitter referenced relative to the cell in which the transmitter is located and the class of the latitude section in which the transmitter is located, a range of the receiver being at most equal to a width of a cell along an axis of variation of the coordinate λ.

2. The transmission method as claimed in claim 1, wherein the transmitter is an onboard responder, the receiver being a transponder capable of interrogating the responder.

3. The transmission method as claimed in claim 2, wherein the message for transmission of λ between the interrogator and the responder is formatted according to the Mark X format comprising 13 pulses, the identifier of the section being coded over b bits, the longitude being coded over 13-b bits.

4. An onboard Identification Friend or Foe (IFF) responder implementing a method for transmission of a coordinate as claimed in claim 2.

5. The transmission method as claimed in claim 3, wherein the latitude sections are separated into three classes C1, C2, C3, the identifier of the latitude section class then being coded over 2 bits.

6. An onboard Identification Friend or Foe (IFF) responder implementing a method for transmission of a coordinate as claimed in claim 3.

7. An onboard Identification Friend or Foe (IFF) responder implementing a method for transmission of a coordinate as claimed in claim 5.

8. The transmission method as claimed in claim 1 wherein the division of the Earth's sphere is carried out according to a "Compact Position Reporting" algorithm, λ varying over a range of 180°, and λ varying over a range of 360°.

9. An onboard Identification Friend or Foe (IFF) responder implementing a method for transmission of a coordinate as claimed in claim 8.

10. The transmission method as claimed in claim 1 wherein the partitioning of all of the latitude sections into M+1 classes is carried out by assigning to each section an integer identifier in the range between 0 and M with M<N, the identifier of the $i^{th}$ section being equal to i modulo (M+1).

11. An onboard Identification Friend or Foe (IFF) responder implementing a method for transmission of a coordinate as claimed in claim 10.

12. An onboard Identification Friend or Foe (IFF) responder implementing a method for transmission of a coordinate as claimed in claim 1.

* * * * *